(12) United States Patent
Carmel

(10) Patent No.: US 12,229,395 B2
(45) Date of Patent: Feb. 18, 2025

(54) INTELLIGENT CONTEXTUAL DATA SELECTION

(71) Applicant: SphereTrax Limited, Hertfordshire (GB)

(72) Inventor: Joseph Alon Carmel, Ruislip (GB)

(73) Assignee: Sphere Trax Limited, Hertfordshire (GB)

( * ) Notice: Subject to any disclaimer, the term of this patent is extended or adjusted under 35 U.S.C. 154(b) by 0 days.

(21) Appl. No.: 18/224,235

(22) Filed: Jul. 20, 2023

(65) Prior Publication Data

US 2025/0028433 A1    Jan. 23, 2025

(51) Int. Cl.
*G06F 3/04847*  (2022.01)
*G06F 3/14*  (2006.01)
*G06F 3/16*  (2006.01)
*G06F 40/40*  (2020.01)

(52) U.S. Cl.
CPC ........ *G06F 3/04847* (2013.01); *G06F 3/1454* (2013.01); *G06F 3/167* (2013.01); *G06F 40/40* (2020.01)

(58) Field of Classification Search
CPC ....... G10L 19/008; G10L 19/16; G10L 19/02; G10L 19/20; G10L 19/00; G10L 19/005; G10L 21/034; G10L 25/18; G10L 25/21; G10L 25/30; G10L 13/00; G10L 15/06; G10L 15/08; G10L 15/22; G10L 19/03; G10L 19/04; G10L 19/18; G10L 19/22; G10L 19/26; G10L 21/0216; G10L 25/78
See application file for complete search history.

(56) References Cited

U.S. PATENT DOCUMENTS

| | | | |
|---|---|---|---|
| 2005/0062869 A1* | 3/2005 | Zimmermann | H04N 7/18 348/E7.071 |
| 2007/0225970 A1* | 9/2007 | Kady | G10L 15/1815 704/E15.024 |
| 2012/0059826 A1* | 3/2012 | Mate | G06F 16/739 707/E17.089 |
| 2012/0158524 A1* | 6/2012 | Hintz | G06Q 30/0277 705/14.73 |
| 2014/0337346 A1* | 11/2014 | Barthel | G06F 16/176 707/738 |
| 2017/0243611 A1* | 8/2017 | Buyuklu | G11B 27/036 |
| 2017/0308292 A1* | 10/2017 | Choi | G06F 16/248 |
| 2019/0356291 A1* | 11/2019 | Saito | H03G 3/14 |
| 2020/0334260 A1* | 10/2020 | Kussmaul | G06F 3/0486 |
| 2020/0409995 A1* | 12/2020 | Sheaffer | H04R 1/406 |

* cited by examiner

*Primary Examiner* — Rayeez R Chowdhury
(74) *Attorney, Agent, or Firm* — Panitch Schwarze Belisario & Nadel LLP

(57) ABSTRACT

A system and method for matching contexts of media files in which a first media data file is selected by use of a least distance algorithm for a number of parameters associated with at least one context input by a user to correlate with corresponding metadata associated with content of a second media data file in order to provide matched first and second media data files.

18 Claims, 5 Drawing Sheets

INTELLIGENT CONTEXTUAL DATA SELECTION

FIELD OF THE DISCLOSURE

The present disclosure relates to a system and method of digital media matching. More particularly, but not exclusively, the present disclosure relates to a system and method of digital media matching of digital audio and video files. Even more particularly, but not exclusively, the present disclosure relates to a system and method of digital media matching of digital audio and video files providing a preview of the matched digital audio and video files.

BACKGROUND

The expected spending on video advertising in excess of $150 Billion in 2023, with a projected compound annualised growth rate in excess of 6.5%. The correct contextual matching, for example by way of non-limiting example in respect of the mood, speed or key, of a soundtrack to a piece of video advertising can greatly enhance the impact of the video advertising and consequently consumer uptake of the product being advertised.

Audio to video matching has been attempted using parsing of text inputs to match a word or phrase to a word or phrase in a song, see for example WO 2015/149690. This does not permit weighting of multiple contextual parameters.

Comparison of "monomers" within two pieces of media has been proposed in order determine similarities between them, see for example WO2019/184523. This method requires prior of a first piece of media to be deconstructed and parsed as a prompt for finding a second comparable piece of media within a library.

SUMMARY

According to a first aspect of the present disclosure there is provided a method of digital media matching comprising:
i) receiving data corresponding to a plurality of contextual user inputs from a user device;
ii) comparing each of the contextual user inputs to a respective context field in metadata associated with each of a plurality of media data files;
iii) determining a subset of the plurality of media data files based upon the comparison of step (ii);
iv) outputting an indicia of each media data file of the subset of media data files to a user.

The method may comprise receiving contextual user inputs from a user by means of a graphical use interface (GUI) comprising graphical representations of a plurality of faders. The method may comprise determining a numerical value for each of the plurality of contextual user inputs based upon a position of a slider of each of the plurality of faders. The method may comprise receiving user input from a user by natural language input. The method may comprise receiving user input via a large language model application programming interface (API). The method may comprise selecting a subset of the plurality of contextual user inputs for step (ii). The method may comprise selecting the subset of the plurality of contextual user inputs for step (ii) where the numerical value of a contextual user input exceeds of a threshold value. The method may comprise selecting the subset of the plurality of contextual user inputs for step (ii) by ranking the numerical values of the plurality of contextual user inputs and selecting the subset of the plurality of contextual user inputs for step (ii) based on the ranking placement. The subset of the plurality of contextual user inputs may comprise the highest ranked user input and a number of contextual user inputs consecutively subsequent thereto.

The respective context field metadata may comprise respective numerical values. Comparing each of the contextual user inputs to the respective context field metadata may comprise determining a numerical difference between each contextual user input numerical value and the respective context field metadata numerical value. The context field metadata may be stored in a separate database to the media files.

The method may comprise summing the numerical differences between each contextual user input numerical value and the respective context field metadata numerical value. The method may comprise ranking the plurality of media files based upon the sum of the numerical differences. Determining the subset of the plurality of media data may comprise setting a threshold value. Determining the subset of the plurality of media data may comprise selecting media data having numerical differences between each contextual user input numerical value and the respective context field metadata numerical value that are below the threshold value. Determining the subset of the plurality of media data may comprise selecting a number of media files having the lowest numerical differences between each contextual user input numerical value and the respective context field metadata numerical value.

The method may comprise merging at least one of the plurality of media files with a video data file to create a merged media data file. The method may comprise merging at least one of the subset of media files with a video data file to create a merged media data file. The method may comprise synchronising a start of the output of the at least one of the subset of media files with at least one of the following in the video data file: start point, user selected event, machine selected event. The method may comprise varying a start of the output of the at least one of the subset of media files by a user. The method may comprise editing the merged media data file. The method may comprise previewing the merged media data file within a video editor at an output device.

The method may comprise sharing the merged media data file on a collaborative platform with at least one other user.

At least one of the plurality of media data files may comprise an immersive audio data file. The immersive audio data file may comprise any of the following data formats: Dolby®Atmos®, Dolby® 5.1.

According to a second aspect of the present disclosure there is provided a processor arranged to execute the method of the first aspect of the present disclosure.

According to a third aspect of the present disclosure there is provided a non-transitory data storage device comprising instructions, which when executed on a processor, cause the processor to execute the method of the first aspect of the present invention.

According to a fourth aspect of the present disclosure there is provided a digital media matching system comprising:
a processor and at least one memory;
the at least one memory being arranged to store a plurality of media data files and metadata associated with each of the respective media data file;
the processor being arranged to receive data corresponding to a plurality of contextual user inputs from a user device;

the processor being arranged to compare each of the contextual user inputs to a respective context field in metadata stored in the at least one memory associated with each of a plurality of media data files;

the processor being arranged to determine a subset of the plurality of media data files based upon the comparison of each of the contextual user inputs to a respective context field in metadata stored in the at least one memory associated with each of a plurality of media data files the processor being arranged to output an indicia of each media data file of the subset of media data files to a user.

The system may comprise a graphical use interface (GUI) comprising graphical representations of a plurality of faders to input the contextual user inputs. The processor may be arranged to determine a numerical value for each of the plurality of contextual user inputs based upon a position of a slider of each of the plurality of faders within the GUI. The system may comprise a natural language input arranged to receive user input. The natural language input may comprise a large language model application programming interface (API).

The processor may be arranged to select a subset of the plurality of contextual user inputs to compare contextual user inputs to a respective context field in metadata stored in the at least one memory associated with each of a plurality of media data files. The processor may be arranged to select the subset of the plurality of contextual user inputs for where the numerical value of a user input exceeds a threshold value. The processor may be arranged to select the subset of the plurality of user inputs by ranking the numerical values of the plurality of user inputs and selecting the subset of the plurality of contextual user inputs based on the ranking placement. The processor may be arranged to rank the subset of the plurality of user inputs may comprise the highest ranked user input and a number of user inputs consecutively subsequent thereto.

The respective context field metadata may comprise respective numerical values. Comparing each of the contextual user inputs to the respective context field metadata may comprise determining a numerical difference between each contextual user input numerical value and the respective context field metadata numerical value. The metadata may be stored in a separate database to the media files.

The processor may be arranged to sum the numerical differences between each contextual user input numerical value and the respective context field metadata numerical value. The processor may be arranged to rank the plurality of media files based upon the sum of the numerical differences. The processor may be arranged to determine the subset of the plurality of media data by selecting media data having numerical differences between each contextual user input numerical value and the respective context field metadata numerical value that are below a threshold value. The processor may be arranged to determine the subset of the plurality of media data by selecting a number of media files having the lowest numerical differences between each contextual user input numerical value and the respective context field metadata numerical value.

The processor may be arranged to merge at least one of the subset of media files with a video data file to create a merged media data file. The processor may be arranged to synchronise a start of the output of the at least one of the subset of media files with at least one of the following in the video data file: start point, user selected event, machine selected event. The processor may be arranged to vary a start of the output of the at least one of the subset of media files within the merged media data file. The processor may be arranged to vary a start of the output of the at least one of the subset of media files in response to user input within the merged media data file. The processor may be arranged to execute a video editor to edit the merged media data file. The processor may be arranged to output a preview of the merged media data file within a video editor on an output device.

The processor may be arranged to sharing the merged media data file on a collaborative platform with at least one other user.

At least one of the plurality of media data files may comprise an immersive audio data file. The immersive audio data file may comprise any of the following data formats: Dolby®Atmos®, Dolby® 5.1.

DESCRIPTION OF THE DRAWINGS

The present disclosure will now be described, purely for illustrative purposes, with reference to the accompanying drawings, in which, by way of non-limiting example only.

DETAILED DESCRIPTION

The following detailed description of example implementations refers to the accompanying drawings. The same reference numbers in different drawings may identify the same or similar elements.

Figure 1:
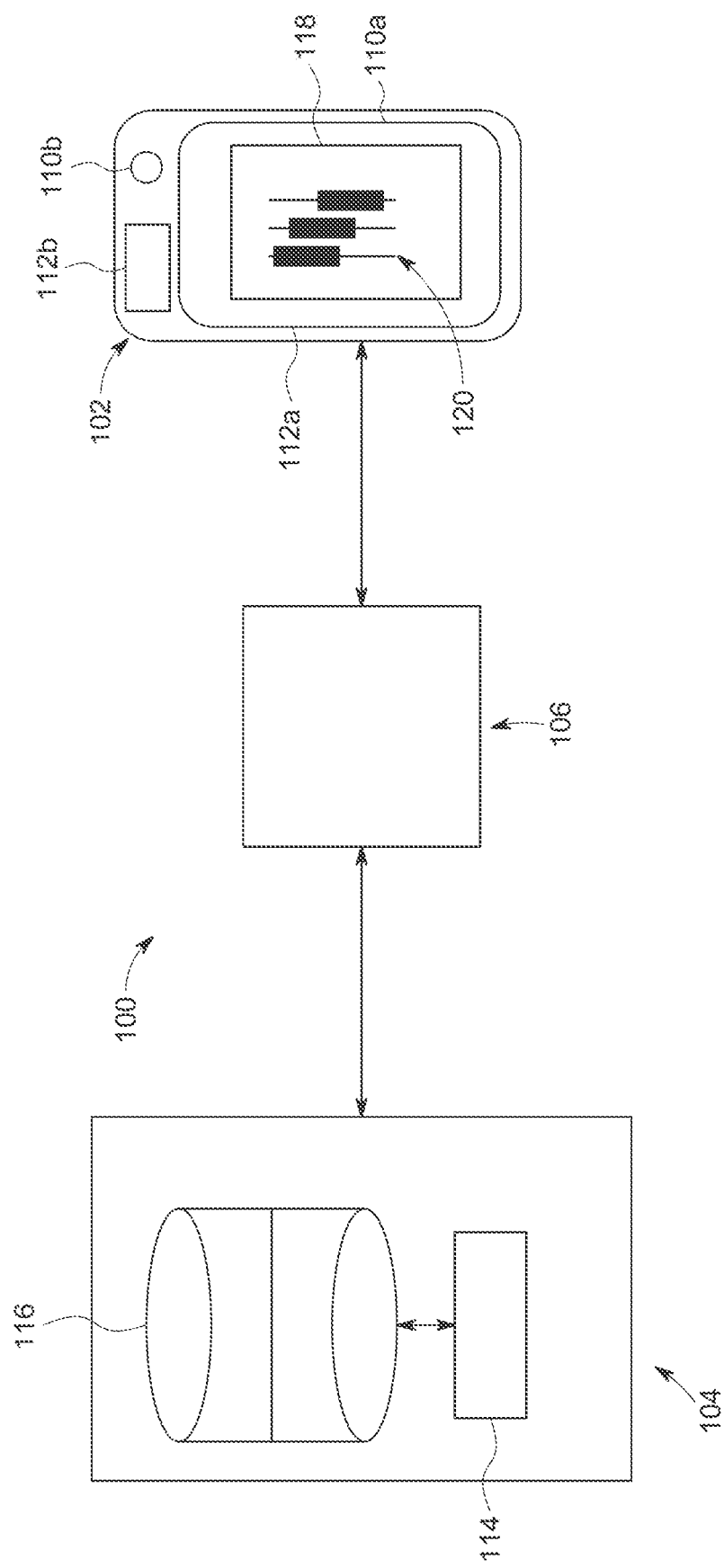
FIG. 1 is a schematic representation of a digital media matching arrangement comprising a digital media matching system in accordance with the fourth aspect of the present disclosure.

Referring now to FIG. 1, a digital media matching arrangement 100 comprises a user device 102 and a media matching system 104 connected via a network 106, typically the Internet or a local area network (LAN). It will be appreciated that the network may be wired or wireless.

The user device 102 may comprise, by way of non-limiting example, a personal computer, a tablet, a mobile telephone or the like. The user device 102 comprises a processor 108 an input devices 110a,b and output devices 112a,b. The input devices 110a,b may comprise, by way of non-limiting example, a touch screen, a keyboard and/or a microphone. The output devices may comprise, by way of non-limiting example, a screen and/or an audio output device such as speaker and/or headphones. In some embodiments, the parameter inputs take the form a fader which will be known to persons in the music industry.

The media matching system 104 comprises one or more processors 114 and one or more storage mediums 116. The processor 114 may be a local processor to the storage medium or it may be remote from the storage medium. The storage medium 116 will typically be, but not limited to, cloud storage such as that provided by Amazon Web Services, Microsoft Azure or Google Firebase. It will be appreciated that in some implementations the storage medium 110 may be local storage comprising, by way of non-limiting example, a magnetic hard disc, a solid state drive or flash memory.

The input device 110a,b displays a GUI 118 comprising a number of contextual parameter inputs 120. The parameter inputs 120 provide for the graded input of the relevance of a contextual parameter in the matching of a piece of media based upon a user's requirements, typically but not exclusively for matching to a piece of video media, such as an advertisement.

Figure 2:
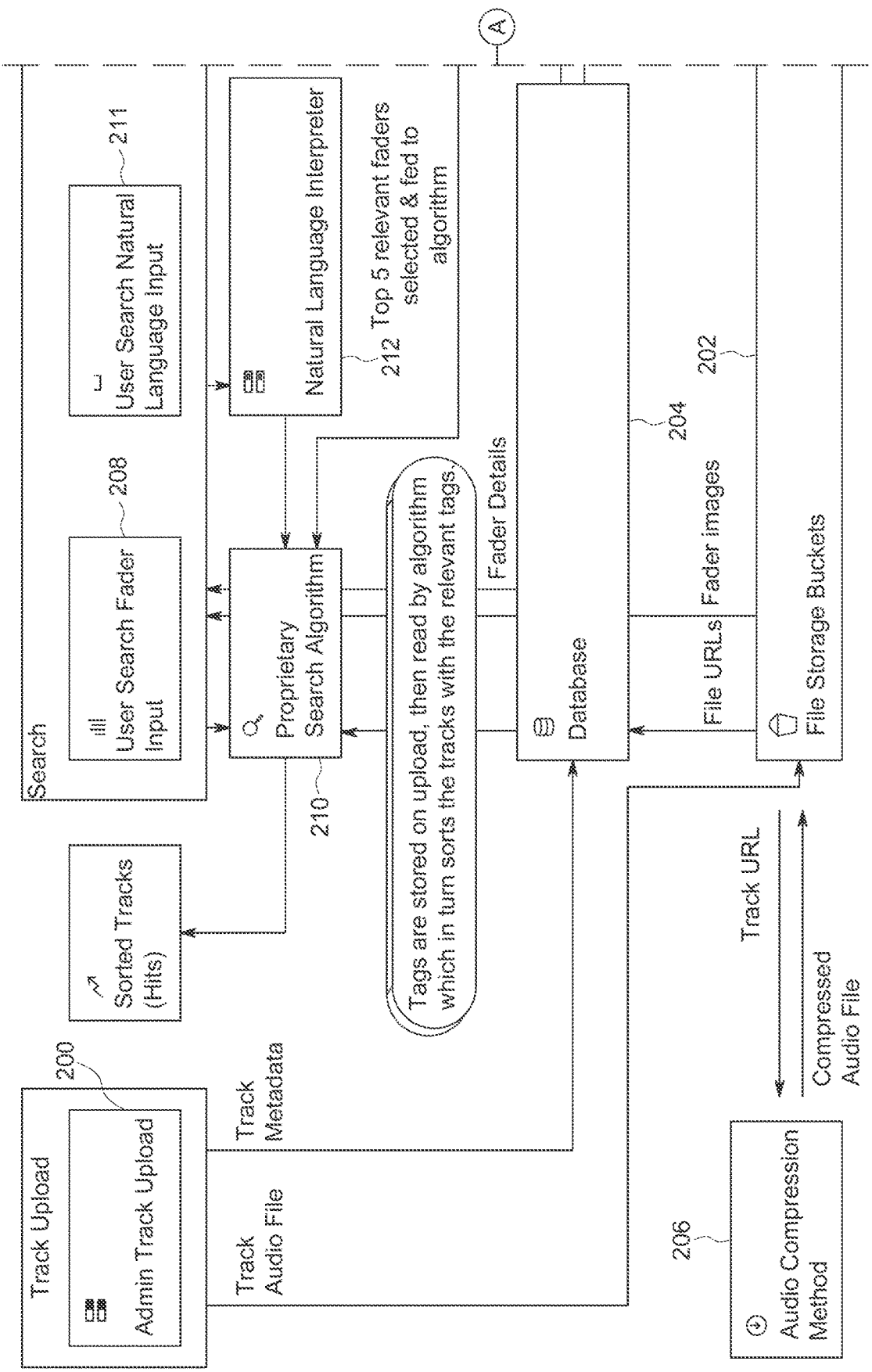
FIG. 2 is a system architecture diagram of the digital media matching arrangement of FIG. 1.
Figure 2:
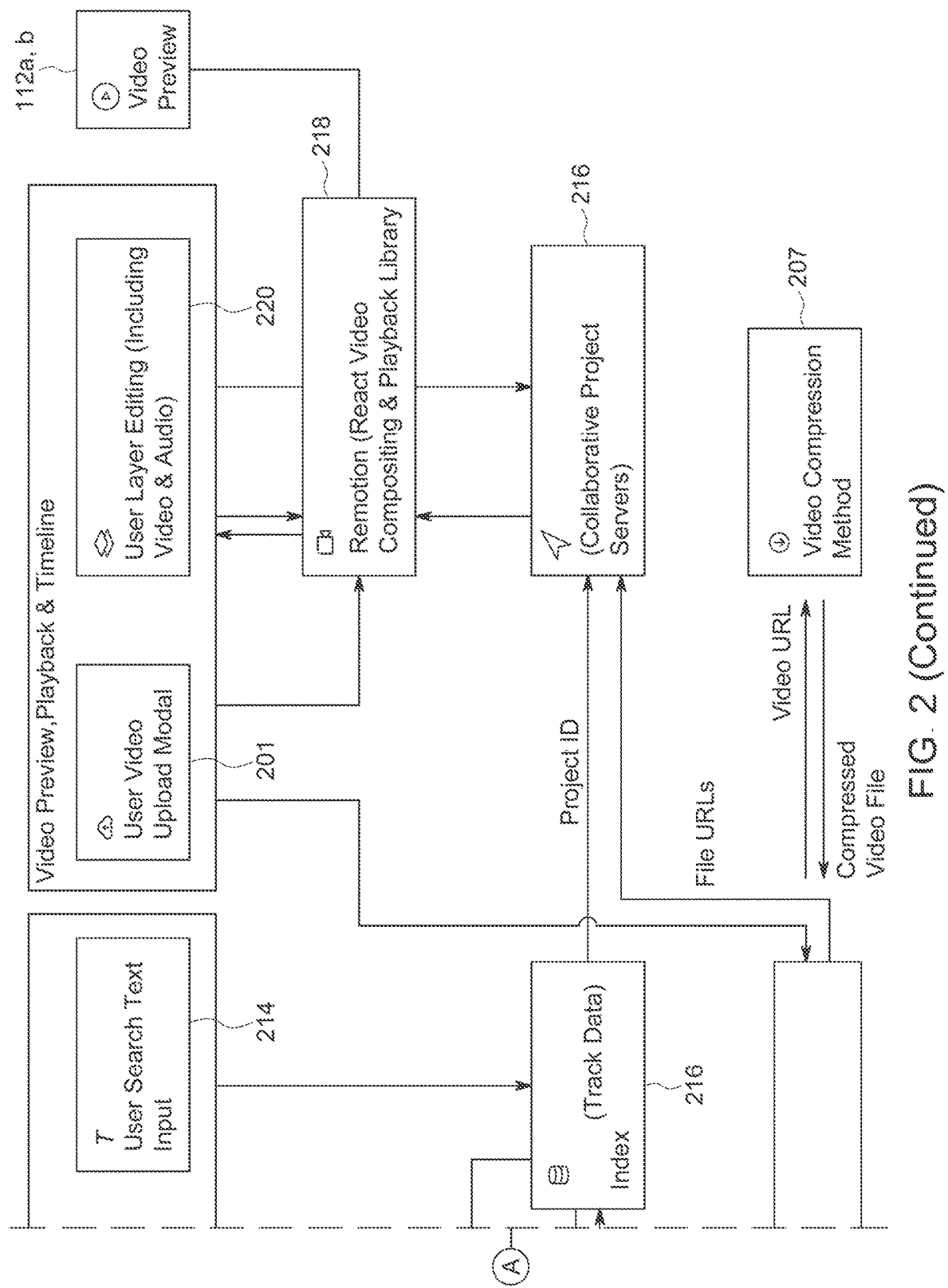

Referring to FIG. 2, audio media data files 200 and optionally video media data files 201 are uploaded to a media file storage database 202 along with corresponding contextual metadata for each audio data files being uploaded to a contextual database 204. In some embodiments the audio data files, typically but not limited to, mp3, FLAC, ALAC or similar file formats. The media file storage database is typically, but not limited, to AWS S3 or Google Firebase database(s). In some embodiments the contextual database 204 is a No SQL database, for example a Google Firebase database. It will be appreciated that in some embodiments the contextual database 204 may be a relational database.

In some embodiments, the media file storage database 202 passes a data file Universal Resource Locator (URL) to respective audio and, if appropriate, video compression engines 206, 207 such that if appropriate a media data file 200, 201 can be compressed and the compress version of any given media data file 200, 201 is stored in the media file storage database 202 and associated with the file's URL.

User inputs can be input to the media matching system 104 via the input devices 110a,b. In an embodiment, a user inputs contextual information via the GUI 118 by moving the key of a fader 208 up and down to indicate the graded relative importance of a given context. Typically, the graded input is in the form a numerical value, by way of non-limiting example, on a scale of 1 to 100, or a percentage value. Non-limiting examples of contextual information include, suspense, anger, speed, key, action. The values from the faders 208 are passed to the search algorithm 210 for subsequent processing as will be described hereinafter with reference to FIG. 3.

In at least one embodiment it is envisaged that there will be in excess of over one hundred possible contextual measures represented by faders. In some embodiments, the input device 110a, b, of interest may be a microphone and a user may query the database by means of a spoken input query 211, such as, by way of non-limiting example, "Scary 20%, fast 18%, Key of G 75%". In some embodiments, the spoken input query 211 is processed by a Large Language Model API 212, see for example https://en.wikipedia.org/wiki/Large language model. It will be appreciated that reference to a Large Language Model is exemplary only and other forms of natural language processing could be used. The natural language processing generates fader values to be passed to the search algorithm 210 for subsequent processing.

In at least some embodiments, the user can enter a plain text search input 214 via a keyboard or touch screen input device 110a,b. In this instance the plain text search string is passed to for analysis to a neural network 216, for example Algolia, for searching against track index data to generate a number of synthesised fader values to be passed to the search algorithm 210 for subsequent processing, for example the top five relevant faders may be synthesised.

The search algorithm 210, which will be described hereinafter, interrogates the contextual database 204 to compare context metadata values to the input metadata from the input devices 110a,b. Based upon the results of the comparison a list of candidate audio media data files, typically audio tracks, is output to the user via the user device 102. In a preferred, by not essential, embodiments the list of candidate audio media data files is sorted according to their relevance, usually with the most relevant candidate media data file being the first media file listed. In an embodiment, the user can access the candidate audio media data file to listen to the audio track through an output device 112a,b, usually a loudspeaker or a headset by clicking on a URL pointing to the media data file in the media file storage database 202.

The user selects one or more of the candidate audio media data files to merge with a video media data file 201 to create a merged media data file. It will be appreciated that in some embodiments, the video data file may be stored at the media file storage database 202 whilst in other embodiments it may be stored remotely from the media file storage database 202.

The audio and video data files along with URLs pointing to them are passed from the media file storage database 202 to a collaborative work platform 216 running on a server to allow multiple users to view and edit the merged media data file. A non-limiting example of such a collaborative work platform is Liveblocks.

The collaborative work platform 216 is in communication with a video compositing application 218, which merges of the audio data file 200 and the video data file 201. A non-limiting example of such a video compositing application is Remotion. In some embodiments the merging of the audio and video data files 200, 201 is executed such that the start of the output of the audio data file 200 corresponds to user set point within the video data file 201, which may or may not correspond to the start of the video stream. It will be appreciated that the start of the audio data file 200 in the merged media data file may correspond to an event or action within the video data file 201. It will be further appreciated that in some embodiments a further video data file can be merged with the either the merged media data file or the audio data file 200.

The video compositing application 218 is a user layer video editing interface 220 to allow users to edit the merged data file, for example to vary the start point of the audio track associated with the audio data file, to shorten it or to edit the video in other ways that will be apparent to the person skilled in the art.

After compositing of the merged media data file and, where appropriate, editing of the merged media data file via the user layer video editing interface the merged media data file is output, previewed, by one or more users at output devices 112a,b, screens, of respective user devices 100.

Figure 3:
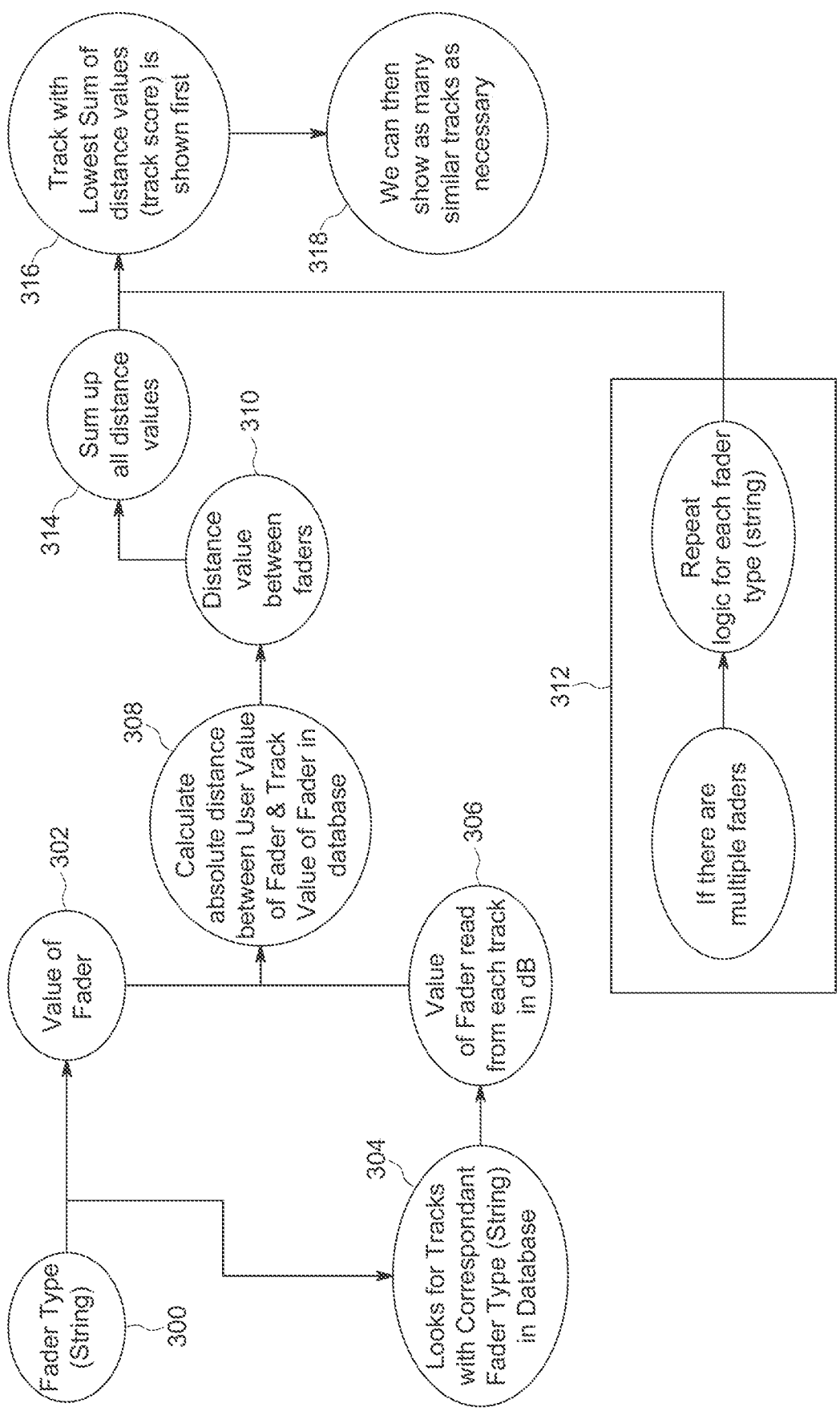
FIG. 3 is a process flow diagram of a matching algorithm executed on a processor of the third aspect of the present disclosure when employed in the digital media matching system of the fourth aspect of the present disclosure.

Referring now to FIG. 3, the search algorithm 210 comprises identifying a fader type from a text string associated with the fader (Step 300). The user input value of each fader is read via the GUI or other input channel (Step 302). The metadata in the contextual database 204 is searched for audio media data files 200 with audio tracks having the fader type identified by the fader type text string (Step 304) and the metadata fader value of the identified fader type for an identified audio track having the fader type is read (Step 306). The absolute distance between the user entered fader value and the metadata fader value for the identified track is calculated (Step 308), for example as if on a number line. This yields a distance value between the metadata fader value of the identified fader type for an identified audio track having the fader type (Step 310). Where multiple fader inputs are utilised by a user, via the GUI or other input channel the preceding steps are repeated for each fader utilised (Step 312). The absolute distances for each fader are summed across all faders utilised by the user to produce a score (Step 314). The audio tracks corresponding to the audio data files 200 are then ranked in respect of ascending sum of absolute distance such that the track with the lowest absolute distance is ranked first (Step 316). A ranked list of tracks is then output to a user via the output device 112a,b, typically a screen, of the user device 100 with the lowest ranked, closest matched, audio file listed first. As many tracks can be listed as necessary from the media data file database 202 (Step 318). Typically, the track listing will comprise a track name which may be in form a URL link to the track in the media file database or the URL could be displayed alongside a plain text name of the track.

Figure 4:
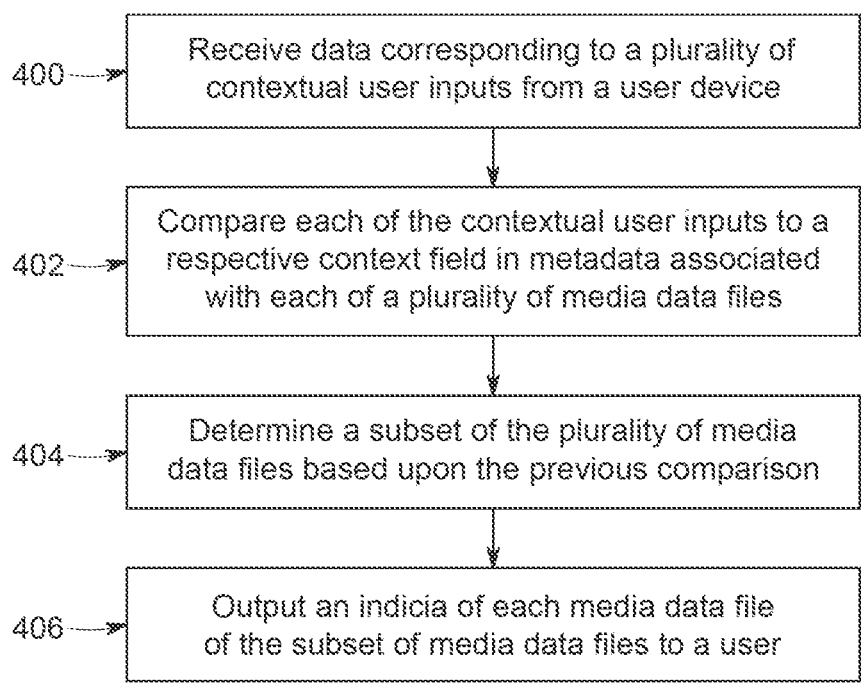
FIG. 4 is a flow diagram of a method of media matching in accordance with the first aspect of the present disclosure.

Referring now to FIG. 4, a method of digital media matching comprises the steps of receiving data corresponding to a plurality of contextual user inputs from a user device (Step 400). The method further comprises comparing each of the contextual user inputs to a respective context field in metadata associated with each of a plurality of media data files (Step 402). The method further comprises determining a subset of the plurality of media data files based upon the previous comparison (Step 404). The method further comprises outputting an indicia of each media data file of the subset of media data files to a user (Step 406).

It will be appreciated that although described with reference to a distributed system, for example, a client-server arrangement, the present disclosure also encompasses embodiments where a suitable software package is loaded and executed on a user device such as a personal computer, laptop, table, mobile telephone or the like.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behaviour of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of digital media matching comprising:
   i) receiving data corresponding to a plurality of contextual user inputs from a user device;
   ii) comparing each of the contextual user inputs to a respective context field in metadata associated with each of a plurality of media data files, wherein the respective context field in metadata includes respective numerical values, and wherein said comparing includes determining a numerical difference between each contextual user input and the respective context field metadata numerical value;
   iii) determining a subset of the plurality of media data files based upon the comparison of step (ii);
   iv) outputting an indicia of each media data file of the subset of media data files to a user.

2. The method of claim 1, further comprising receiving contextual user inputs from a user via a graphical user interface (GUI) including graphical representations of a plurality of faders.

3. The method of claim 2, further comprising:
   determining a numerical value for each of the plurality of contextual user inputs based upon a position of a slider of each of the plurality of faders within the GUI.

4. The method of claim 1, further comprising:
   receiving user input from a user by natural language input via a large language model application programming interface (API).

5. The method of claim 1, further comprising:
   selecting a subset of the plurality of contextual user inputs for step (ii).

6. The method of claim 5, wherein
   selecting the subset of the plurality of contextual user inputs for step (ii) includes ranking the numerical values of the plurality of contextual user inputs, and
   selecting the subset of the plurality of contextual user inputs for step (ii) is based on the ranking placement, wherein the subset of the plurality of contextual user inputs includes the highest ranked user input and a number of contextual user inputs consecutively subsequent thereto.

7. The method of claim 1, further comprising:
summing the numerical differences between each contextual user input numerical value and the respective context field metadata numerical value,
wherein determining the subset of the plurality of media data comprises selecting a number of media files having the lowest numerical differences between each contextual user input numerical value and the respective context field metadata numerical value.

8. The method of claim 1, further comprising:
merging at least one of the plurality of media files with a video data file to create a merged media data file.

9. The method of claim 1, further comprising:
synchronising a start of the output of the at least one of the subset of media files with at least one of the following in a video data file: start point, user selected event, machine selected event.

10. A non-transitory data storage device comprising instructions, which when executed on a processor, cause the processor to execute the method of claim 1.

11. A digital media matching system comprising:
a processor, and
at least one memory;
wherein the at least one memory is configured to store a plurality of media data files and metadata associated with each of the respective media data file, and
wherein the processor is configure to
receive data corresponding to a plurality of contextual user inputs from a user device,
compare each of the contextual user inputs to a respective context field in metadata stored in the at least one memory associated with each of a plurality of media data files, wherein the respective context field in metadata includes respective numerical values, and wherein in comparing each of the contextual user inputs to the respective context field in metadata, the processor determines a numerical difference between each contextual user input and the respective context field metadata numerical value,
determine a subset of the plurality of media data files based upon the comparison of each of the contextual user inputs to a respective context field in metadata stored in the at least one memory associated with each of a plurality of media data files, and
to output an indicia of each media data file of the subset of media files to a user.

12. The system of claim 11, further comprising:
a graphical user interface (GUI) including graphical representations of a plurality of faders to input the contextual user inputs,
wherein the processor is further to determine a numerical value for each of the plurality of contextual user inputs based upon a position of a slider of each of the plurality of faders within the GUI.

13. The system of claim 11, wherein the processor is further configured to
select a subset of the plurality of contextual user inputs to compare contextual user inputs to a respective context field in metadata stored in the at least one memory associated with each of a plurality of media data files,
select the subset of the plurality of user inputs by ranking the numerical values of the plurality of user inputs and selecting the subset of the plurality of contextual user inputs based on the ranking placement, and
rank the subset of the plurality of user inputs such that the subset of the plurality of user inputs comprises the highest ranked user input and a number of user inputs consecutively subsequent thereto.

14. The system of claim 11, wherein the processor is further configured to merge at least one of the subset of media files with a video data file to create a merged media data file.

15. The system of claim 14, wherein the processor is further configured to
sum the numerical differences between each contextual user input numerical value and the respective context field metadata numerical value,
rank the plurality of media files based upon the sum of the numerical differences,
determine the subset of the plurality of media data by selecting media data having numerical differences between each contextual user input numerical value and the respective context field metadata numerical value that are below a threshold value, and
determine the subset of the plurality of media data by selecting a number of media files having the lowest numerical differences between each contextual user input numerical value and the respective context field metadata numerical value.

16. The system of claim 11, wherein the processor is further configured to output a preview of the merged media data file within a video editor on an output device.

17. The system of claim 11, wherein the processor is further configured to share the merged media data file on a collaborative platform with at least one other user.

18. The system of claim 11, wherein at least one of the plurality of media data files includes an immersive audio data file.

* * * * *